US 8,721,911 B2

(12) United States Patent
Guo et al.

(10) Patent No.: US 8,721,911 B2
(45) Date of Patent: May 13, 2014

(54) AGING-RESISTANT AEROSOL GENERATING AGENT AND A PREPARATION METHOD THEREOF

(75) Inventors: Hongbao Guo, Xi'an (CN); Gaofeng Zheng, Xi'an (CN); Weipeng Zhang, Xi'an (CN)

(73) Assignee: Shaanxi J & R Fire Fighting Co., Ltd., Xi'an (CN)

( * ) Notice: Subject to any disclaimer, the term of this patent is extended or adjusted under 35 U.S.C. 154(b) by 98 days.

(21) Appl. No.: 13/499,662

(22) PCT Filed: Jul. 3, 2010

(86) PCT No.: PCT/CN2010/074967
§ 371 (c)(1),
(2), (4) Date: Mar. 30, 2012

(87) PCT Pub. No.: WO2011/088667
PCT Pub. Date: Jul. 28, 2011

(65) Prior Publication Data
US 2012/0273711 A1     Nov. 1, 2012

(30) Foreign Application Priority Data

Jan. 19, 2010   (CN) .......................... 2010 1 0013618

(51) Int. Cl.
*A62D 1/06*      (2006.01)
*B29C 43/02*     (2006.01)
*A62C 5/00*      (2006.01)
*A62D 1/00*      (2006.01)
*C06B 31/06*     (2006.01)

(52) U.S. Cl.
CPC . *A62D 1/06* (2013.01); *A62C 5/006* (2013.01); *A62D 1/0014* (2013.01); *C06B 31/06* (2013.01); *B29C 43/02* (2013.01)
USPC ............ 252/4; 252/5; 252/6; 169/46; 169/47; 169/12; 264/319

(58) Field of Classification Search
CPC ....................................................... A62D 1/06
USPC ............................................................ 252/4
See application file for complete search history.

(56) References Cited

U.S. PATENT DOCUMENTS

| 2,841,481 | A  | * | 7/1958  | Hall ............................ 149/19.1 |
| 5,588,493 | A  |   | 12/1996 | Spector et al. |
| 6,042,664 | A  |   | 3/2000  | Kozyrev et al. |
| 6,116,348 | A  |   | 9/2000  | Drakin |
| 6,264,772 | B1 | * | 7/2001  | Drakin ....................... 149/19.92 |
| 6,689,285 | B2 | * | 2/2004  | Rusin et al. ....................... 252/3 |
| 8,097,667 | B2 | * | 1/2012  | Guo et al. ........................ 524/88 |
| 2001/0011567 | A1 | * | 8/2001  | Drakin ......................... 149/19.1 |
| 2002/0121622 | A1 | * | 9/2002  | Rusin et al. ...................... 252/2 |
| 2013/0181157 | A1 | * | 7/2013  | Guo et al. ......................... 252/2 |
| 2013/0181158 | A1 | * | 7/2013  | Guo et al. ......................... 252/2 |

FOREIGN PATENT DOCUMENTS

| CN | 1288766    A  | 3/2001 |
| CN | 101745195  A  | 6/2010 |
| EP | 0561035   A1  | 9/1993 |
| EP | 0976424   A1  | 2/2000 |
| RU | 2105581   C1  | 2/1998 |
| RU | 2106167   C1  | 3/1998 |
| RU | 2116095   C1  | 7/1998 |
| WO | 97/33653  A1  | 9/1997 |

OTHER PUBLICATIONS

International Search Report received for PCT Patent Application No. PCT/CN2010/074967, mailed on Oct. 28, 2010, 8 pages (4 pages of English Translation and 4 pages of PCT Search Report).

* cited by examiner

*Primary Examiner* — Joseph D Anthony
(74) *Attorney, Agent, or Firm* — Studebaker & Brackett PC

(57) ABSTRACT

The present invention relates to a novel aging-resistant aerosol generating agent and preparation method thereof. The aging-resistant aerosol generating agent in the present invention comprises oxidizer, reducer and bonding agent, wherein the oxidizer is potassium nitrate, the bonding agent is phenolic resin, and the reducer is melamine; the weight percentages of the three constituents are: potassium nitrate: 60~80%, phenolic resin: 8~15%, and melamine: the rest. In the preparation process, phenolic resin is dissolved in ethanol to give phenolic resin solution at concentration by 40~50 wt %; the oxidizer and reducer are pulverized, mixed, and then the phenolic resin solution is added to the mixed powder; next, the mixture is agitated, pelletized, dried, and shaped by pressure molding. Compared to that in the prior art, the aerosol generating agent in the present invention has higher fire suppression efficiency and higher fire suppression rate, and greatly improved aging resistant performance.

5 Claims, No Drawings

AGING-RESISTANT AEROSOL GENERATING AGENT AND A PREPARATION METHOD THEREOF

CROSS REFERENCE TO RELATED APPLICATIONS

This is a U.S. National Phase patent application of PCT/CN2010/074967, filed Jul. 3, 2010, which claims priority to Chinese Patent Application No. 201010013618.3, filed Jan. 19, 2010, each of which is hereby incorporated by reference in the present disclosure in its entirety.

FIELD OF THE INVENTION

The present invention belongs to the technical field of fire suppression, and relates to a novel aging-resistant aerosol generating agent and a preparation method thereof.

BACKGROUND OF THE INVENTION

As a substitute of Halon products, aerosol has advantages such as high fire suppression performance, free of secondary pollution, etc., and is widely applied in fire suppression industry at home and abroad. In existing products, aerosol generating agents are mainly formulated from oxidizer, reducer, bonding agent, additive and processing assistant, etc. In these formulae, by selecting appropriate materials, not only the fire suppression efficacy of the aerosol generating agent can be greatly improved, but also the properties of the aerosol generating agent related with processing, storage and use can be improved. These properties are indispensable for the aerosol generating agent.

In the prior art of aerosol fire suppression techniques, some aerosol generating agents are disclosed in Patent Application No. WO9733653 (PCT/RU 1997/000065, 1997 Jul. 8), RU2106167 (1998 Mar. 10), RU2116095 (1998 Jul. 27), RU2105581 (1998 Feb. 27), EP0561035 (1992 Sep. 1), U.S. Pat. No. 5,588,493 (1994 Oct. 25), U.S. Pat. No. 6,116,348 (1999 Jul. 8), CN99115863.6 and U.S. Pat. No. 6,042,664 (1998 Jul. 21). In these aerosol generating agents, highly sensitive or active potassium perchlorate or potassium chlorate is used as oxidizer, or additives such as magnesium powder, aluminum powder, sulfur powder, boron powder, potassium ferricyanide, dicyclopentadienyl iron are added. However, these highly active oxidizers or additives are adverse to long-term storage of the generating agent and significantly degrade the aging resistant performance of the generating agent.

In Patent Application No. CN99115863.6, an aerosol generating agent, formulated with potassium nitrate, melamine and phenolic resin as the main material and potassium ferricyanide and potassium bicarbonate as the auxiliary material, is disclosed, wherein phenolic resin is dissolved in ethanol to produce phenolic resin solution at 10%~30% concentration; the fire suppression efficiency of the aerosol generating agent disclosed in the patent application document is 30~40 g/m$^3$. An aerosol generating agent is disclosed in U.S. Pat. No. 6,042,664 (1998 Jul. 21). The constituents of the aerosol generating agent include: potassium nitrate by 67~72 wt %, phenolic resin by 8~12 wt %, dicyandiamide by 9~16 wt %, and the rest constituents are potassium bicarbonate, potassium ferricyanide or potassium benzoate. It is proved that the gas yield rate is low when dicyandiamide is used in the fire suppressant composition. The fire suppression efficiency of the aerosol generating agent disclosed in the patent application is 35~45 g/m$^3$. In addition, since both of the patents employ additives (e.g., potassium ferricyanide) to increase activity and the aerosol generating agent has lower stability in storage and lower aging resistant performance.

SUMMARY OF THE INVENTION

In view of the present situation of the prior art, the object of the present invention is to provide a potassium salt type aerosol generating agent that is simple in formula can produce gases at high yield rate and burn completely, and has excellent aging resistant performance, and a preparation method thereof.

The aerosol generating agent in the present invention comprises oxidizer, reducer and bonding agent. The oxidizer is potassium nitrate and the bonding agent is phenolic resin; wherein the reducer is melamine; the constituents of the aerosol generating agent are: potassium nitrate: 60~80 wt %, phenolic resin: 8~15 wt %, and melamine: the rest.

Preferably, the content of the potassium nitrate is 70~74 wt %, the content of the phenolic resin is 10~12 wt %, and the rest part is melamine.

The preparation method of the aerosol generating agent in the present invention comprises the following steps:

Step 1: dissolving phenolic resin in ethanol to prepare phenolic resin solution by 40~55 wt % concentration;

Step 2: pulverizing the oxidizer and reducer to 80-200 standard sieve mesh, mixing them at the specified proportion, and sieving the mixture through a 80~200 mesh sieve for three times to mix the materials to homogeneous state;

Step 3: adding the phenolic resin solution into mixed powder, agitating for a specified time, and then pelleting through a 40-mesh sieve; then, drying the agent at 40° C. temperature and 20% or lower relative humidity, till the percentage of volatile constituents is lower than 1%;

Step 4: shaping the dry agent by pressure molding at specified pressure.

Compared to that in the prior art, the novel aging-resistant aerosol generating agent in the present invention has the following advantages: high fire suppression efficiency and high fire suppression rate; in addition, since no highly active oxidizer or additive is used in the formula, the aging resistant performance of the generating agent is improved.

DETAILED DESCRIPTION OF THE EMBODIMENTS

The aerosol generating agent and the preparation method thereof in the present invention will be detailed in following examples.

Example 1

Weigh 8 kg phenolic resin and dissolve the phenolic resin completely in 8 kg ethanol to give bonding agent solution.

Weigh 60 kg potassium nitrate and 30 kg melamine, pulverize them to 80 standard mesh, and mix them. Sieve through an 80-mesh sieve for three times to mix them to homogeneous state. Then add phenolic resin solution into the mixed powder, agitate for 10 mins., and pelletize through a 40-mesh sieve mandatorily, and then dry the generating agent at 40° C. and 20% or lower relative humidity, till the percentage of volatile constituents in the generating agent is lower than 1%. Shape the dry chemical grain by pressure molding at 10 Mpa pressure.

Example 2

Weigh 10 kg phenolic resin and dissolve the phenolic resin completely in 15 kg ethanol to produce bonding agent solution.

Weigh 70 kg potassium nitrate and 20 kg melamine, pulverize them to 100 standard mesh, and mix them. Sieve through a 100-mesh sieve for three times to mix them to homogeneous state. Then, add phenolic resin solution into the mixed powder, agitate for 10 mins., and pelletize through a 40-mesh sieve mandatorily, and then dry the generating agent at 40° C. and 20% or lower relative humidity, till the percentage of volatile constituents in the generating agent is lower than 1%. Shape the dry chemical grain by pressure molding at 10 Mpa pressure.

Example 3

Weigh 15 kg phenolic resin and dissolve the phenolic resin completely in 11 kg ethanol to produce bonding agent solution.

Weigh 60 kg potassium nitrate and 25 kg melamine, pulverize them to 200 standard mesh, and mix them. Sieve through a 200-mesh sieve for three times, to mix them to homogeneous state. Then, add phenolic resin solution into the mixed powder, agitate for 10 min., and pelletize through a 40-mesh sieve mandatorily, and then dry the generating agent at 40° C. and 20% or lower relative humidity, till the percentage of volatile constituents in the generating agent is lower than 1%. Shape the dry chemical grain by pressure molding at 10 Mpa pressure.

As reported in literature and patent, the fire suppression efficiency of potassium salt type aerosol generating agents is usually 30~50 g/m$^3$; in contrast, the fire suppression efficiency of aerosol generating agents in the above-described examples 1~3 is 20~25 g/m$^3$.

Another characteristic of the present invention is: no highly active oxidizer or additive is used in the formula; therefore, so the aging resistant performance of the aerosol generating agent is improved. Aging resistant performance is tested on the basis of aging time. The relation between aging temperature and life time is as follows:

t=aging duration, by days, and t≥26 days;
T=temperature of aging test, by ° C., and T≥80° C.;
K=0.1 ln(2)≈0.069315;
A=life time constant, shown in the following Table 1:

TABLE 1

Table of Life Time - Constant A

| Life Time (year) | Constant (A) |
|---|---|
| 10 | 40,895 |
| 15 | 59,325 |
| 20 | 77,755 |
| 25 | 96,175 |

On the basis of the above formula, the values shown in Table 2 are obtained:

TABLE 2

Table of Aging Time, Aging Temperature and Life Time

| Aging Temperature (° C.) | Aging Duration Determined on the Basis of Life Time | | | |
|---|---|---|---|---|
| | 10 years | 15 years | 20 years | 25 years |
| 80 | 160 | 232 | 304 | 375 |
| 85 | 113 | 164 | 215 | 266 |
| 90 | 80 | 116 | 152 | 188 |
| 95 | 56 | 82 | 107 | 133 |
| 100 | 40 | 58 | 76 | 94 |
| 105 | 28 | 41 | 54 | 66 |
| 110 | [a] | 29 | 38 | 47 |
| 115 | [a] | [a] | 27 | 33 |

[a] The aging duration is shorter than the minimum allowable time, and t ≥ 25 days.

The aerosol generating agent in the present invention is compared with the aerosol generating agents disclosed in several patents, in terms of material, minimum consumption rate for fire suppression, and aging resistance, as shown in Table 3:

TABLE 3

Comparison of Materials and Advantages

| | Weight Percentage in Formula (%) | | | | | |
|---|---|---|---|---|---|---|
| Item | Example 1 | Example 2 | Example 3 | SOL[1] | CN99115863.6 | US6042664 |
| Potassium nitrate | 60 | 70 | 60 | 70 | 69 | 70 |
| Phenolic resin | 8 | 10 | 15 | 10 | 6 | 11 |
| Melamine | 30 | 20 | 25 | — | 9 | — |
| Dicyandiamide | — | — | — | 10 | — | 12 |
| Potassium ferricyanide | — | — | — | 7 | 7 | 7 |
| Other additives | — | — | — | 3 (sulfur powder) | 9 (potassium bicarbonate) | — |
| Performance Comparison | | | | | | |
| Minimum fire suppression concentration against gasoline (g/m$^3$) | 20 | 25 | 21 | 30 | 35 | 35 |
| 100° C. aging duration (day) | 40 | 40 | 40 | 11[2] | 17[2] | 13[2] |

Note:
[1]SOL is the generating agent used in an aerosol product from Italy;
[2]The generating agent burns and decomposes in the aging test.

Tests have been shown: after test for 40 days at 100° C., the aerosol generating agent in examples 1~3 in the present invention has no change in terms of spurting time and burning state compared to the values before aging test, which means, the aerosol generating agent in the present invention can be stored for 10 years at normal temperature, without any performance degradation; in contrast, all of the aerosol generating agents disclosed in other patents burn and decompose in the test. With the simplest formula of generating agent, the present invention achieves higher fire suppression efficacy and higher aging-resistant performance over similar products in the prior art.

Though no highly active oxidizer or additive is used in the present invention, the ethanol solution of phenolic resin prepared through a special process in the present invention has concentration by 40~55 wt %. The phenolic resin can be used not only as bonding agent but also as flaming agent, and thereby improves the burning efficiency of the generating agent.

It is noted that the above-described examples are exemplary. On the basis of the above instruction for the present invention, those skilled in the art can easily make modifications or variations to the embodiments without departing from the spirit of the present invention; however, all these modifications or variations shall be deemed as falling into the protected scope of the present invention. Those skilled in the art shall appreciate that the above description is only provided to elaborate and explain the object of the present invention, instead of constituting any confinement to the present invention. The protective scope of the present invention shall only be confined by the claims and their equivalence.

The invention claimed is:

1. An aging-resistant aerosol generating agent, characterized in that the aerosol generating agent comprises oxidizer, reducer and bonding agent; wherein the oxidizer is potassium nitrate, the bonding agent is phenolic resin, and the reducer is melamine; the weight percentages of the three constituents are: potassium nitrate: 60~80%, phenolic resin: 8~15%, and melamine: the rest.

2. The aging-resistant aerosol generating agent according to claim 1, characterized in that the content of the potassium nitrate is 70~74%, the content of the phenolic resin is 10~12%, and the rest part is melamine.

3. A preparation method of the novel aging-resistant aerosol generating agent according to claim 1, characterized in that it comprises the following steps:

step 1: dissolving phenolic resin in ethanol to prepare phenolic resin solution by 40~55 wt % concentration;

step 2: pulverizing the oxidizer and reducer to 80~200 standard sieve mesh, mixing them at the specified proportion, and sieving the mixture through a 80~200 mesh sieve for three times to mix the materials to homogeneous state;

step 3: adding the phenolic resin solution into the mixed powder, agitating for a specified time, and then pelleting through a 40-mesh sieve; then, drying the agent at 40° C. temperature and 20% or lower relative humidity, till the percentage of volatile constituents is lower than 1%;

step 4: shaping the dry agent by pressure molding at specified pressure.

4. The preparation method of the aging-resistant aerosol generating agent according to claim 3, characterized in that the mixing time in step 3 is 10 mins.

5. The preparation method of the aging-resistant aerosol generating agent according to claim 3, characterized in that the pressing pressure in step 4 is 10 Mpa.

* * * * *